(12) United States Patent
Pueschel

(10) Patent No.: US 11,111,884 B2
(45) Date of Patent: Sep. 7, 2021

(54) SPARK-IGNITION INTERNAL COMBUSTION ENGINE HAVING UREA INTRODUCTION DEVICE AND METHOD FOR OPERATING AN INTERNAL COMBUSTION ENGINE OF THIS TYPE

(71) Applicant: Bayerische Motoren Werke Aktiengesellschaft, Munich (DE)

(72) Inventor: Eckard Pueschel, Marzling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/963,805

(22) PCT Filed: Jan. 18, 2019

(86) PCT No.: PCT/EP2019/051197
§ 371 (c)(1),
(2) Date: Jul. 21, 2020

(87) PCT Pub. No.: WO2019/149542
PCT Pub. Date: Aug. 8, 2019

(65) Prior Publication Data
US 2020/0362798 A1 Nov. 19, 2020

(30) Foreign Application Priority Data
Feb. 5, 2018 (DE) ...................... 10 2018 201 756.5

(51) Int. Cl.
*F02M 25/03* (2006.01)
*F02D 41/00* (2006.01)

(52) U.S. Cl.
CPC ......... *F02M 25/03* (2013.01); *F02D 41/0025* (2013.01)

(58) Field of Classification Search
CPC .......................... F02M 25/03; F02D 41/0025
See application file for complete search history.

(56) References Cited

U.S. PATENT DOCUMENTS

| 8,276,550 B1 | 10/2012 | Noguchi et al. | |
| 2008/0223021 A1* | 9/2008 | Shaikh et al. | F01N 3/10 60/287 |

(Continued)

FOREIGN PATENT DOCUMENTS

| CN | 101253316 A | 8/2008 |
| CN | 101265826 A | 9/2008 |

(Continued)

OTHER PUBLICATIONS

PCT/EP2019/051197, International Search Report dated Apr. 5, 2019 (Two (2) pages).

(Continued)

*Primary Examiner* — Kevin A Lathers
(74) *Attorney, Agent, or Firm* — Crowell & Moring LLP

(57) ABSTRACT

A spark-ignition internal combustion engine has an air intake tract for supplying fresh air to a combustion chamber of the spark-ignition internal combustion engine, an exhaust tract for discharging exhaust gases from the combustion chamber, and a urea introduction device having a urea injection nozzle for introducing an aqueous urea solution into the combustion chamber. The urea injection nozzle is disposed in the combustion chamber or upstream of the combustion chamber in relation to an air flow from the air intake tract into the combustion chamber.

4 Claims, 1 Drawing Sheet

(56) References Cited

U.S. PATENT DOCUMENTS

2014/0053817 A1    2/2014  Yokota et al.
2014/0311135 A1  10/2014  Miyagawa et al.

FOREIGN PATENT DOCUMENTS

| | | |
|---|---|---|
| CN | 107592897 A | 1/2018 |
| DE | 10 2013 108 868 A1 | 2/2014 |
| FR | 2 965 854 A1 | 4/2012 |
| WO | WO 2010/002737 A1 | 1/2010 |

OTHER PUBLICATIONS

German-language German Office Action issued in German application No. 10 2018 201 756.5 dated Nov. 6, 2018 (Four (4) pages).
Chinese Office Action issued in Chinese application No. 201980008195.5 dated Jul. 2, 2021, with English translation (Twelve (12) pages).

* cited by examiner

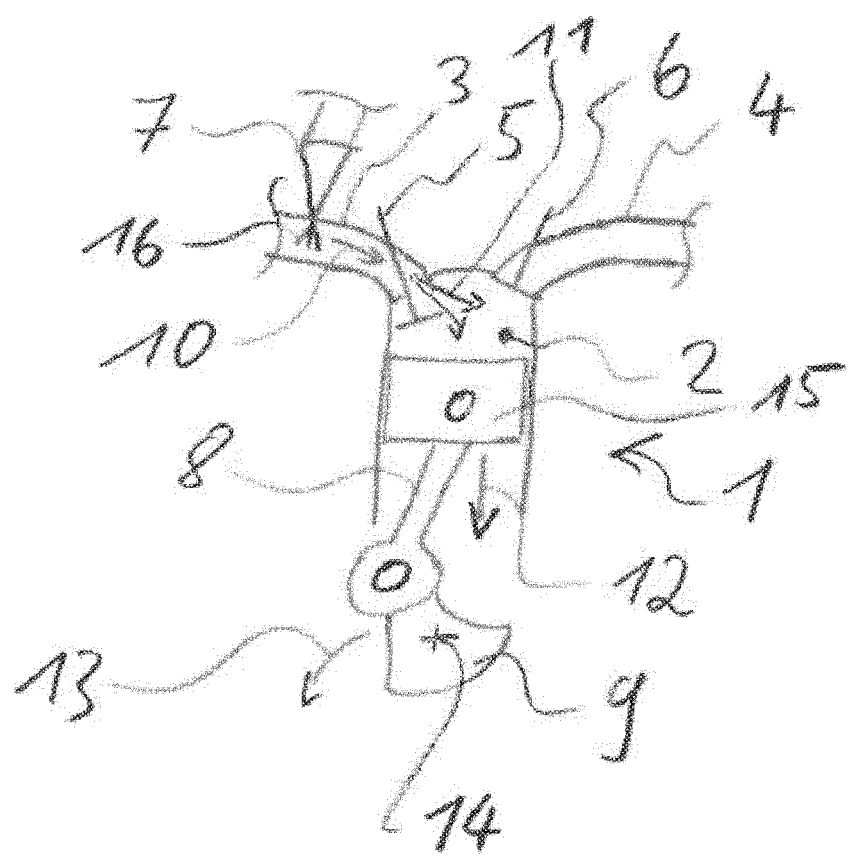

SPARK-IGNITION INTERNAL COMBUSTION ENGINE HAVING UREA INTRODUCTION DEVICE AND METHOD FOR OPERATING AN INTERNAL COMBUSTION ENGINE OF THIS TYPE

BACKGROUND AND SUMMARY OF THE INVENTION

The invention relates to an internal combustion engine which can be operated according to the spark-ignition principle (spark-ignition internal combustion engine), having a device for introducing an aqueous urea solution into at least one combustion space of the internal combustion engine. Such a device is known from DE 10 2013 108 868 A1.

From the prior art it is known, in the case of internal combustion engines operating according to the diesel principle, to introduce an aqueous urea solution into the exhaust gas in order to reduce pollutant emissions. An aqueous urea solution of this type is known and obtainable at filling stations and in the retail trade under the trade name Adblue. Furthermore, it is known, in the case of internal combustion engines operating according to the spark-ignition principle, to introduce water into the combustion space, what is referred to as water injection, in particular for increasing power. Decalcified pure water is used for the water injection. If the water injection is operated with water not designated for this purpose, in particular with tap water, the internal combustion engine may be damaged, fail or only still operated at reduced power.

It is an object of the invention to specify a spark-ignition internal combustion engine having improved operational reliability.

Within the context of the invention, a spark-ignition internal combustion engine should be understood as meaning a reciprocating-piston internal combustion engine for providing drive power in order to overcome driving resistances in a ground-based motor vehicle, in particular a passenger motor vehicle. A spark-ignition internal combustion engine should preferably be understood as meaning what is referred to as gasoline or spark-ignition engine for use in a passenger vehicle. Internal combustion engines of this type are known from the prior art and have what is referred to as a combustion chamber for burning fuel.

The spark-ignition internal combustion engine preferably has a multiplicity of combustion chambers of this type, in particular what are referred to as cylinders. In the at least one combustion chamber of the spark-ignition internal combustion engine, the fuel is burned with fresh air being supplied from the surroundings. For the supply of the fresh air from the environment surrounding the spark-ignition internal combustion engine into the at least one combustion chamber, the spark-ignition internal combustion engine has what is referred to as an air inlet tract.

Within the context of the invention, the air inlet tract should be understood as meaning the device for supplying fresh air from the environment surrounding the spark-ignition internal combustion engine into the combustion chamber. During operation of the internal combustion engine, an air flow preferably arises through the air inlet tract toward the at least one combustion chamber, and therefore the combustion chamber is arranged downstream of the air inlet tract with respect to the air flow of fresh air from the surroundings.

Furthermore, the spark-ignition internal combustion engine has an exhaust tract which is configured for discharging exhaust gases from the combustion chamber into the environment surrounding the spark-ignition internal combustion engine. In particular during the burning of the fuel in the combustion chamber, the exhaust gas is produced from the fuel and the fresh air supplied to the combustion chamber, the exhaust gas being dischargeable from the combustion chamber into the environment surrounding the internal combustion engine by means of the exhaust tract.

Furthermore, the spark-ignition internal combustion engine has what is referred to as a urea introduction device. Within the context of the invention, the urea introduction device should be understood as meaning a device for introducing an aqueous urea solution. Within the context of the invention, an aqueous urea solution should be understood as meaning a liquid, in particular a liquid as is known under the trade name Adblue. The aqueous urea solution is preferably a liquid which, at least substantially as constituents, comprises 32.5% of urea and 67.5% of demineralized water, or is preferably composed of the constituents.

In order to introduce the aqueous urea solution, in particular into the fresh air supplied to the combustion chamber or the fresh air to be supplied to the combustion chamber, the urea introduction device has at least one urea injection nozzle. A urea injection nozzle of this type within the context of the invention should be understood as meaning in particular a device which is provided to output the aqueous urea solution from the urea introduction device systematically into the fresh air.

The urea injection nozzle is preferably arranged directly in the at least one combustion chamber of the spark-ignition internal combustion engine, or, furthermore preferably, at least one urea injection nozzle is in each case arranged in a multiplicity of combustion chambers of the spark-ignition internal combustion engine or, particularly preferably, in all of the combustion chambers of the spark-ignition internal combustion engine. Furthermore preferably, the urea injection nozzle or a multiplicity of urea injection nozzles is arranged upstream of the combustion chamber with respect to the flow direction of the fresh air from the environment surrounding the spark-ignition internal combustion engine into the at least one combustion chamber.

In particular by means of an arrangement of this type of the urea injection nozzle, it is possible for the aqueous urea solution to be supplied to the fresh air, preferably to all of the fresh air flowing into the combustion chamber, and it is thereby achievable in particular to use all of the evaporation enthalpy of the aqueous urea solution uniformly. In particular by using the entire evaporation enthalpy of the aqueous urea solution, particularly good cooling of the fresh air can be achieved and the spark-ignition internal combustion engine can thereby be operated particularly reliably.

Furthermore, a method for operating the abovementioned spark-ignition internal combustion engine is provided. The spark-ignition internal combustion engine is designed in particular as a four stroke engine and, during operation of same, an intake stroke, a compression stroke, a working stroke and an exhaust stroke are provided. Four stroke engines of this type are known from the prior art. In order to burn fuel with fresh air, the previously mentioned four strokes take place time and again in the sequence mentioned during the operation of the spark-ignition internal combustion engine.

For the controlled supply of fresh air to the combustion chamber and for the controlled discharging of the exhaust gas from the combustion chamber, the spark-ignition internal combustion engine preferably has what are referred to as control valves, in particular at least one what is referred to as an inlet valve and at least one what is referred to as an outlet valve. In particular during the intake stroke, the at least one inlet valve is opened and the at least one outlet valve is closed. It is possible here, at the beginning or at the end of the intake stroke, for both the at least one inlet valve and the at least one outlet valve to be opened simultaneously; this phenomenon is known as what is referred to as valve overlapping.

The invention is preferably focused on the fact that, when the inlet valve is opened and, furthermore preferably, when the outlet valve is closed, aqueous urea solution is introduced into the air inlet tract or directly into the combustion chamber by means of the urea injection nozzle. In particular by means of a method of this type, good thorough mixing of the fresh air with the aqueous urea solution can be achieved and thus a particularly operationally reliable operation of the spark-ignition internal combustion engine can be achieved.

The invention is explained in more detail below with reference to a FIGURE which is at least partially in a schematized form.

BRIEF DESCRIPTION OF THE DRAWING

The FIGURE shows a cross section through a spark-ignition internal combustion engine.

DETAILED DESCRIPTION OF THE DRAWING

The spark-ignition internal combustion engine 1 has a combustion chamber 2. In the combustion chamber 2, fuel is burned together with fresh air; exhaust gas is produced in the process. The fresh air flows through the inlet tract 3 in direction 10 into the combustion chamber 2 and leaves the latter through the outlet tract 4.

In an alternative which is not illustrated, the urea injection nozzle is arranged directly in the combustion chamber; the urea injection nozzle is therefore arranged in each case directly in the combustion chamber or upstream of the combustion chamber with respect to the flow of fresh air 10 in the inlet tract.

In order to control the flows (fresh air, exhaust gas), what are referred to as charge changing, the spark-ignition internal combustion engine 1 has at least one inlet valve 5 and at least one outlet valve 6 per combustion chamber 2.

The inlet valve 5 is illustrated in the opened state and the outlet valve 6 in the closed state; the piston 15 moves in direction 12 and fresh air 11 is sucked in via the inlet valve 5 into the combustion chamber 2. The piston 15 is coupled via the connecting rod 8 to the crankshaft 9 and the crankshaft 9 rotates in direction of rotation 13 about the axis of rotation 14. Aqueous urea solution 16 is introduced by the urea introduction device into the fresh air via the urea injection nozzle 7.

In the case of a spark-ignition internal combustion engine with charging, in particular with turbocharging, with the arrangement illustrated of the urea injection nozzle 7 in the inlet tract 3, the fresh air introduced into the combustion chamber is already cooled in the inlet tract 3 by evaporation of the aqueous urea solution.

LIST OF REFERENCE CHARACTERS

1 Spark-ignition internal combustion engine
2 Combustion chamber
3 Inlet tract
4 Outlet tract
5 Inlet valve
6 Outlet valve
7 Urea injection nozzle
8 Connecting rod
9 Crankshaft
10 Flow of the fresh air in the inlet tract to the combustion chamber
11 Fresh air sucked into the combustion chamber in the intake stroke
12 Direction of movement of the piston in the intake stroke
13 Direction of rotation of the crankshaft
14 Axis of rotation of the crankshaft
15 Piston
16 Aqueous urea solution

What is claimed is:

1. A spark-ignition internal combustion engine, comprising:
   a combustion chamber;
   an air inlet tract, wherein air is suppliable to the combustion chamber via the air inlet tract;
   an exhaust tract, wherein exhaust gases are dischargeable from the combustion chamber via the exhaust tract; and
   a urea introduction device with a urea injection nozzle, wherein an aqueous urea solution is introducible into the combustion chamber via the urea injection nozzle, wherein the urea injection nozzle is disposed in the combustion chamber or upstream of the combustion chamber with respect to an air flow from the air inlet tract into the combustion chamber, and wherein the aqueous urea solution is a liquid which comprises urea and demineralized water.

2. A method for operating the spark-ignition internal combustion engine according to claim 1, comprising the acts of:
   operating the spark-ignition internal combustion engine as a four stroke engine with an intake stroke, a compression stroke, a working stroke, and an exhaust stroke;
   at least during the intake stroke introducing an aqueous urea solution directly into the air inlet tract or into the combustion chamber by the urea injection nozzle; and
   cooling an air flowing into the combustion chamber through the air inlet tract by evaporation of the aqueous urea solution.

3. The spark-ignition internal combustion engine according to claim 1, wherein the aqueous urea solution comprises 32.5% of urea and 67.5% of demineralized water.

4. The spark-ignition internal combustion engine according to claim 1, wherein the urea injection nozzle is disposed in the combustion chamber.

* * * * *